(12) United States Patent
Miyamoto et al.

(10) Patent No.: US 6,791,951 B1
(45) Date of Patent: Sep. 14, 2004

(54) CONNECTION ESTABLISHMENT METHOD WITHOUT SPECIFYING CALLED TERMINAL, SWITCHED NETWORK CONTROL DEVICE AND SYSTEM USING THIS METHOD

(75) Inventors: Junnosuke Miyamoto, Saitama (JP); Hitomi Murakami, Saitama (JP); Shuji Kawabe, Tokyo (JP); Kazuyasu Matsumoto, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/551,571

(22) Filed: Apr. 18, 2000

(30) Foreign Application Priority Data

Oct. 27, 1999 (JP) ............................................ 11-305393
Dec. 27, 1999 (JP) ............................................ 11-370088

(51) Int. Cl.[7] ............................................ H04B 12/56
(52) U.S. Cl. ...................................... 370/270; 370/260
(58) Field of Search ................................ 370/230, 260, 370/270, 352, 360, 422

(56) References Cited

U.S. PATENT DOCUMENTS

| 5,519,773 | A | * | 5/1996 | Dumas et al. | 379/265.05 |
| 5,558,339 | A | * | 9/1996 | Perlman | 463/42 |
| 5,586,257 | A | * | 12/1996 | Perlman | 463/42 |
| 5,956,485 | A | * | 9/1999 | Perlman | 709/204 |
| 5,974,453 | A | * | 10/1999 | Andersen et al. | 709/220 |
| 6,167,440 | A | | 12/2000 | Hirai | |
| 6,256,661 | B1 | * | 7/2001 | Terahama et al. | 709/201 |
| 6,393,467 | B1 | * | 5/2002 | Potvin | 709/217 |

FOREIGN PATENT DOCUMENTS

JP          05083421 A    2/1993

* cited by examiner

*Primary Examiner*—Wellington Chin
*Assistant Examiner*—William Schultz
(74) *Attorney, Agent, or Firm*—Arent Fox PLLC

(57) ABSTRACT

A first connection stage includes connecting by a switched network control device a call from a first terminal with a terminal selection device, noticing "there is no terminal to be connected" to the first terminal as a selected result from the terminal selection device when no terminal is selected, and disconnecting the call. A second connection stage includes connecting by the switched network control device a call from a second terminal with the terminal selection device, noticing "there is a terminal to be connected" and "a connection number of the first terminal" to the second terminal as a selected result from the terminal selection device when the first terminal is selected, and disconnecting the call. A third connection stage includes noticing "a connection number of the first terminal" from the second terminal to the switched network control device, and connecting by the switched network control device the call from the second terminal with the first terminal.

42 Claims, 7 Drawing Sheets

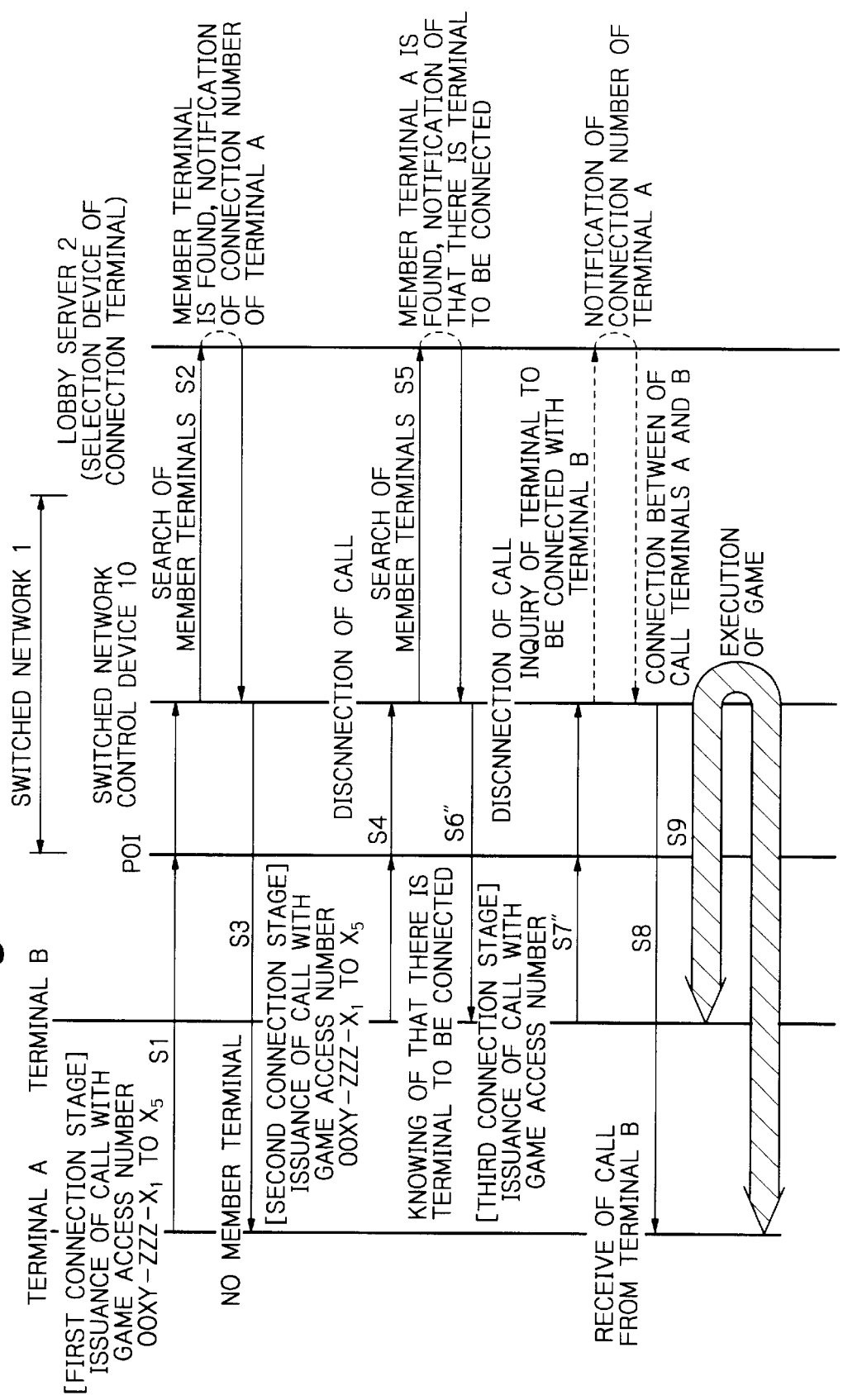

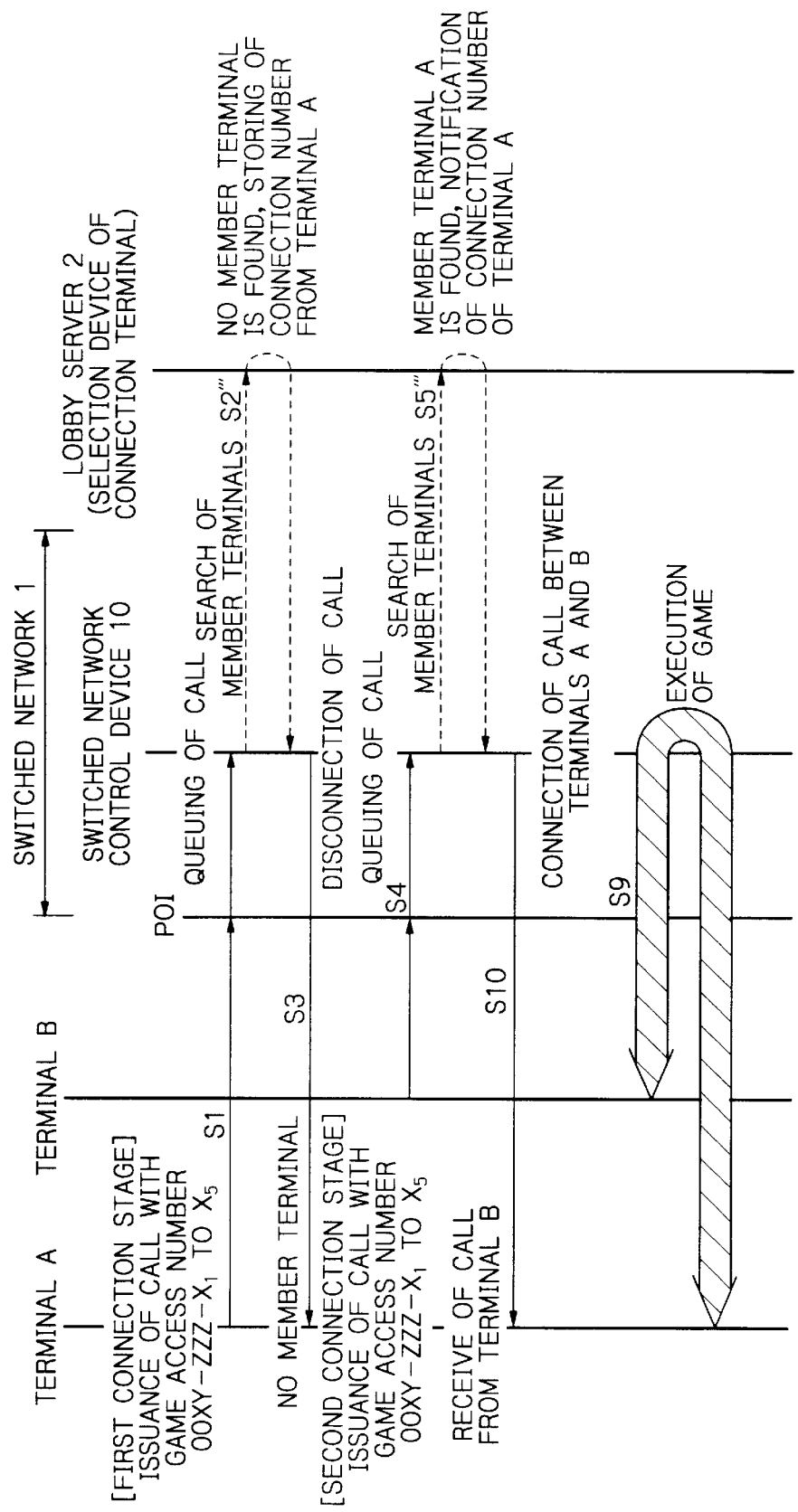

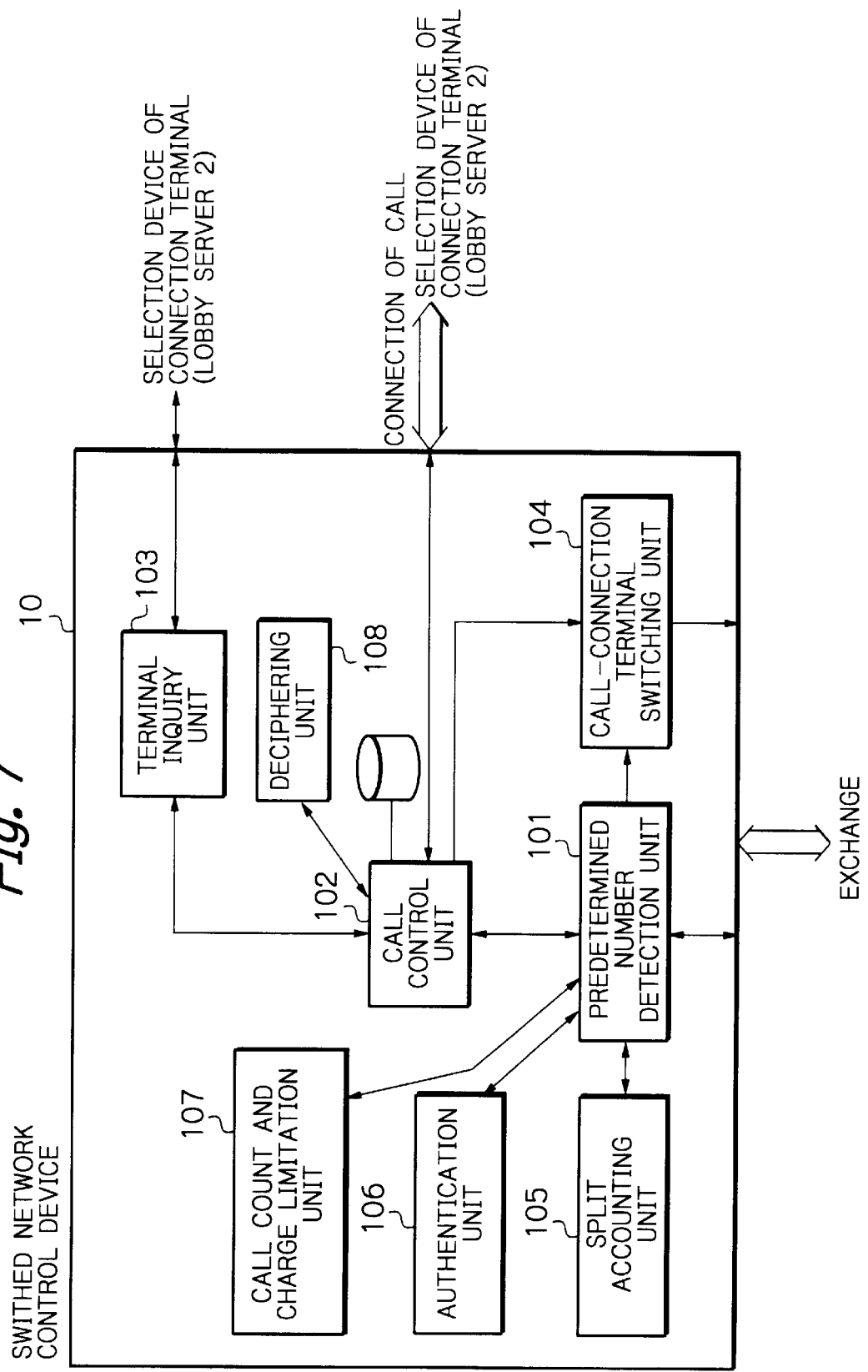

CONNECTION ESTABLISHMENT METHOD WITHOUT SPECIFYING CALLED TERMINAL, SWITCHED NETWORK CONTROL DEVICE AND SYSTEM USING THIS METHOD

FIELD OF THE INVENTION

The present invention relates to a method and system for establishing a connection between terminals without specifying a called terminal, and a switched network control device using this method. Particularly, the present invention relates to a software game service capable of executing a one-to-one game or a game in which a plurality of players can simultaneously participate.

DESCRIPTION OF THE RELATED ART

Conventionally, a software game company has a game service facility with a plurality of modems and a lobby server in order to execute one-to-one games or games in each of which a plurality of players can simultaneously participate.

FIG. 1 schematically illustrates a system configuration of a conventional game service system. As shown in the figure, a player who wants to participate in a game can access to a server 2 of the software game company from a game terminal 4 via a telephone network 3 or Internet. Thus, the game can be advanced by a plurality of players who log in the server 2.

Most of the latest software games require real time high-speed transmission in order to more increase an actual feeling of the game. Especially, in match type games such as shooting games, car race or rally games and battle games, it is necessary to transmit control information between the participated players in an instant. However, in the conventional game service system, because many communication devices such as routers, modems or terminal adapters (TA) are existed between players connected with each other via the telephone network or the Internet, there is a large time delay in information transmission between the players and thus it is difficult to play with satisfaction such games requiring high-speed information transmission.

Also, according to the conventional game service, since an accounting system in which the account is always charged to an originating player (caller accounting system) is adopted, it is very inconvenient for playing a one-to-one match type game between two players.

Furthermore, the conventional game service system cannot be expected to completely keep identity of a game terminal in secret. Most of game players will hope to hide behind anonymity when they participate in games like as in the chat page of Internet. Also, it is very important for the connection number of the game terminal to be kept secret so that it may not be abused.

SUMMARY OF THE INVENTION

It is therefore an object of the present invention to provide a method and system for establishing a connection between terminals without specifying a called terminal, and a switched network control device using this method, whereby high-speed information transmission can be expected in a one-to-one communication or a communication in which a plurality of terminals can simultaneously participate.

Another object of the present invention is to provide a method and system for establishing a connection between terminals without specifying a called terminal, and a switched network control device using this method, whereby split accounting can be expected in a one-to-one communication or a communication in which a plurality of terminals can simultaneously participate.

Further object of the present invention is to provide a method and system for establishing a connection between terminals without specifying a called terminal, and a switched network control device using this method, whereby the identity of a terminal subscriber can be kept secret in a one-to-one communication or a communication in which a plurality of terminals can simultaneously participate.

According to the present invention, a method establishes a connection in a system without specifying a called terminal. The system includes a plurality of terminals which contain first and second terminals, a terminal selection device for selecting at least one terminal to be connected from the terminals and a switched network control device for controlling connection of call between the terminals and the terminal selection device. The method includes first to third connection stages. The first connection stage includes issuing a call from the first terminal using a predetermined number without specifying a called terminal, connecting by the switched network control device the call from the first terminal with the terminal selection device, registering the first terminal in the terminal selection device when no terminal is selected, noticing "there is no terminal to be connected" to the first terminal as a selected result from the terminal selection device when no terminal is selected, and disconnecting the call. The second connection stage includes issuing a call from the second terminal using a predetermined number without specifying a called terminal, connecting by the switched network control device the call from the second terminal with the terminal selection device, noticing "there is a terminal to be connected" and "a connection number of the first terminal" to the second terminal as a selected result from the terminal selection device when the first terminal is selected, and disconnecting the call. The third connection stage includes issuing a call from the second terminal using the predetermined number when the selection result is "there is a terminal to be connected", noticing "a connection number of the first terminal" from the second terminal to the switched network control device, and connecting by the switched network control device the call from the second terminal with the first terminal.

Since calls of a plurality of terminals can be directly connected, high-speed information transmission is expected in a one-to-one communication or a communication in which a plurality of terminals can simultaneously participate. Thus, software services that require real time operations can be used between the terminals.

According to the present invention, also, a method for establishing a connection in a system without specifying a called terminal includes first to third connection stages. The first connection stage includes issuing a call from the first terminal using a predetermined number without specifying a called terminal, connecting by the switched network control device the call from the first terminal with the terminal selection device, registering the first terminal in the terminal selection device when no terminal is selected, noticing "there is no terminal to be connected" to the first terminal as a selected result from the terminal selection device when no terminal is selected, and disconnecting the call. The second connection stage includes issuing a call from the second terminal using a predetermined number without specifying a called terminal, connecting by the switched network control device the call from the second terminal with the terminal selection device, noticing "there is a terminal to be connected" and cipher data of "a connection number of the first terminal" to the second terminal as a selected result from the terminal selection device when the first terminal is selected, and disconnecting the call. The third connection stage includes issuing a call from the second terminal using the predetermined number when the selection result is "there is a terminal to be connected", noticing "cipher data of a connection number of the first terminal" from the second terminal to the switched network control device, deciphering the cipher data to obtain "a connection number of the first terminal", and connecting by the switched network control device the call from the second terminal with the first terminal.

The connection number of the selected first terminal can be kept secret. Thus, the connection number is never used by an illegal terminal.

According to the present invention, furthermore, a method for establishing a connection in a system without specifying a called terminal includes first to third connection stages. The first connection stage includes issuing a call from the first terminal using a predetermined number without specifying a called terminal, connecting by the switched network control device the call from the first terminal with the terminal selection device, registering the first terminal in the terminal selection device when no terminal is selected, noticing "there is no terminal to be connected" to the first terminal as a selected result from the terminal selection device when no terminal is selected, and disconnecting the call. The second connection stage includes issuing a call from the second terminal using a predetermined number without specifying a called terminal, connecting by the switched network control device the call from the second terminal with the terminal selection device, noticing "there is a terminal to be connected" to the second terminal as a selected result from the terminal selection device when the first terminal is selected, and disconnecting the call. The third connection stage includes issuing a call from the second terminal using the predetermined number when the selection result is "there is a terminal to be connected", noticing the predetermined number from the switched network control device to the terminal selection device to obtain the connection number of the first terminal, and connecting by the switched network control device the call from the second terminal with the first terminal.

According to the present invention, also, a method for establishing a connection in a system without specifying a called terminal includes first and second connection stages. The first connection stage includes issuing a call from the first terminal using a predetermined number without specifying a called terminal, queuing and inquiring the call from the first terminal by the switched network control device to the terminal selection device, noticing "there is no terminal to be connected" to the first terminal as a selected result from the terminal selection device when no terminal is selected, and disconnecting the call. The second connection stage includes issuing a call from the second terminal using a predetermined number without specifying a called terminal, queuing and inquiring the call from the second terminal by the switched network control device to the terminal selection device, noticing "there is a terminal to be connected" and "a connection number of the first terminal" to the switched network control device as a selected result from the terminal selection device when the first terminal is selected, calling the first terminal from the switched network control device when the selection result is "there is a terminal to be connected", and connecting by the switched network control device the call from the second terminal with the first terminal.

It is preferred that the method is used in a service for providing a place in which a plurality of members for operating the terminals can simultaneously participate. The terminals may have at least one kind of game software, and the terminal selection device may select at least one game player under a predetermined condition. Since high-speed information transmission is provided between the game players, software games that require real time high-speed transmission can be enjoyed. The above-mentioned service may be a service for television conference that requires high-speed transmission of image data.

It is preferred that the predetermined number includes a common number which specifies the service, and includes an ID number of the game player, a number representing kind of the game service, a game class number, a geographic area number of a selected game player and/or an accounting method number. Thus, the game provider can provide various kinds of game services.

It is also preferred that the terminal selection device has a database for storing personal information of the game player and historical information of game results, and that the terminal selection device selects the second terminal to be connected depending on the predetermined number from the first terminal, the personal information of the game player and/or the historical information of game results. Thus, the game provider can provide various kinds of game services.

It is preferred that the terminal selection device registers the predetermined number from the first terminal as in waiting state when noticing "there is no terminal to be connected" to the first terminal as the selected result, and selects in a higher priority the first terminal based on the registered predetermined number in response to later inquiry for selection of a game player.

It is also preferred that the switched network control device authenticates the terminals when one of the terminals issues a call using a predetermined number. Thus, it is possible to prevent a mala fide player from using the service.

It is preferred that the switched network control device executes a split accounting for dividing a connection charge among terminals connected with each other. This accounting system if desired for the game service.

It is also preferred that the switched network control device rejects connection of a call from a terminal when the number of calls from the terminal exceeds a predetermined number or a connection charge of the terminal exceeds a predetermined limit.

According to the present invention, a system for establishing a connection without specifying a called terminal includes a plurality of terminals which contain first and second terminals, a terminal selection device for selecting at least one terminal to be connected from the terminals and a switched network control device for controlling connection of call between the terminals and the terminal selection device. The second terminal includes a unit for issuing a call using a predetermined number without specifying a called terminal, and a unit for noticing a connection number of the first terminal to be connected to the switched network control device. The switched network control device includes a unit for receiving the call from the second terminal, a unit for connecting the call from the second terminal with the first terminal when the connection number of the first terminal is noticed from the second terminal, and a unit for connecting the call from the second terminal with the terminal selection device when the connection number of the first terminal is not noticed from the second terminal. The terminal selection device includes a unit for noticing "there is no terminal to be connected" to the second terminal as a selected result to disconnect the call when no terminal is selected, and for noticing "there is a terminal to be connected" and "a connection number of the first terminal" to the second terminal as a selected result when the first terminal is selected to disconnect the call.

According to the present invention, a system for establishing a connection without specifying a called terminal includes a plurality of terminals which contain first and second terminals, a terminal selection device for selecting at least one terminal to be connected from the terminals and a switched network control device for controlling connection of call between the terminals and the terminal selection device. The second terminal includes a unit for issuing a call using a predetermined number without specifying a called terminal, and a unit for noticing cipher data of a connection number of the first terminal to be connected to the switched network control device. The switched network control device includes a unit for receiving the call from the second terminal, a unit for deciphering the cipher data when the cipher data of the connection number of the first terminal is noticed from the second terminal, and a unit for connecting the call from the second terminal with the first terminal by using the deciphered connection number of the first terminal. The terminal selection device includes a unit for noticing "there is no terminal to be connected" to the second terminal as a selected result to disconnect the call when no terminal is selected, and for noticing "there is a terminal to be connected" and "cipher data of a connection number of the first terminal" to the second terminal as a selected result when the first terminal is selected to disconnect the call.

According to the present invention furthermore, a system for establishing a connection without specifying a called terminal includes a plurality of terminals which contain first and second terminals, a terminal selection device for selecting at least one terminal to be connected from the terminals and a switched network control device for controlling connection of call between the terminals and the terminal selection device. The second terminal includes a unit for issuing a call using a predetermined number without specifying a called terminal. The switched network control device includes a unit for receiving the call from the second terminal, a unit for obtaining a connection number of the first terminal from the terminal selection device by noticing the predetermined number of the second terminal to the terminal selection device, a unit for noticing, "there is no terminal to be connected" to the second terminal and for disconnecting the call from the second terminal when "there is no terminal to be connected" is noticed from the terminal selection device, and a unit for connecting the call from the second terminal with the first terminal when "there is a terminal to be connected" and "a connection number of the first terminal" are noticed from the terminal selection device. The terminal selection device includes a unit for noticing "there is no terminal to be connected" to the switched network control device as a selected result in response to the noticed predetermined number of the second terminal when no terminal is selected, and for noticing "there is a terminal to be connected" and "a connection number of the first terminal" to the switched network control device as a selected result in response to the noticed predetermined number of the second terminal when the first terminal is selected.

Also, according to the present invention, a system for establishing a connection without specifying a called terminal includes a plurality of terminals which contain first and second terminals, a terminal selection device for selecting at least one terminal to be connected from the terminals and a switched network control device for controlling connection of call between the terminals and the terminal selection device. The second terminal includes a unit for issuing a call using a predetermined number without specifying a called terminal. The switched network control device includes a unit for receiving the call from the second terminal, a unit for queuing the call, unit for obtaining a connection number of the first terminal from the terminal selection device by noticing the predetermined number of the second terminal to the terminal selection device, a unit for noticing, "there is no terminal to be connected" to the second terminal and for disconnecting the call from the second terminal when "there is no terminal to be connected" is noticed from the terminal selection device, and a unit for connecting the call from the second terminal with the first terminal when "there is a terminal to be connected" and "a connection number of the first terminal" are noticed from the terminal selection device. The terminal selection device includes a unit for noticing "there is no terminal to be connected" to the switched network control device as a selected result in response to the noticed predetermined number of the second terminal when no terminal is selected, and for noticing "there is a terminal to be connected" and "a connection number of the first terminal" to the switched network control device as a selected result in response to the noticed predetermined number of the second terminal when the first terminal is selected.

According to the present invention, furthermore, a switched network control device connected to a terminal selection device which selects at least one first terminal to be connected to a second terminal and notices, "there is no terminal to be connected" or "there is a terminal to be connected" and "a connection number of the first terminal", for connecting the call with a predetermined number without specifying a called terminal from the second terminal with the first terminal includes a predetermined number detection unit for detecting a predetermined number and a call control unit for connecting a call. The call control unit connects the second terminal with the terminal selection device when the predetermined number detection unit detects only "a predetermined number", and connects the second terminal with the first terminal when the predetermined number detection unit detects both "a predetermined number" and "a connection number of the first terminal".

It is preferred that the switched network control device further includes a unit for deciphering cipher data when the cipher data of a connection number of the first terminal is noticed to the switched network control device.

It is also preferred that the switched network control device further includes a terminal inquiry unit for inquiring "a connection number of the first terminal" to the terminal selection device based upon "a predetermined number" from the second terminal, and that the call control unit obtains "a connection number of the first terminal" from the terminal inquiry unit when the predetermined number detection unit detects "there is a terminal to be connected" and "a predetermined number".

It is preferred that the switched network control device further includes an authentication unit for authenticating the terminals, and a split accounting unit for rejecting connection of a call from a terminal when the number of calls from the terminal exceeds a predetermined number or a connection charge of the terminal exceeds a predetermined limit.

Further objects and advantages of the present invention will be apparent from the following description of the preferred embodiments of the invention as illustrated in the accompanying drawings.

BRIEF DESCRIPTION OF THE DRAWINGS

FIG. 5 schematically illustrates a third sequence of a three-times connection method in the system shown in FIG. 2;

FIG. 6 schematically illustrates a sequence of a two-times connection method in the system shown in FIG. 2; and FIG. 7 schematically illustrates a configuration of a switched network control device according to the present invention.

DESCRIPTION OF THE PREFERRED EMBODIMENTS

Figure 1:
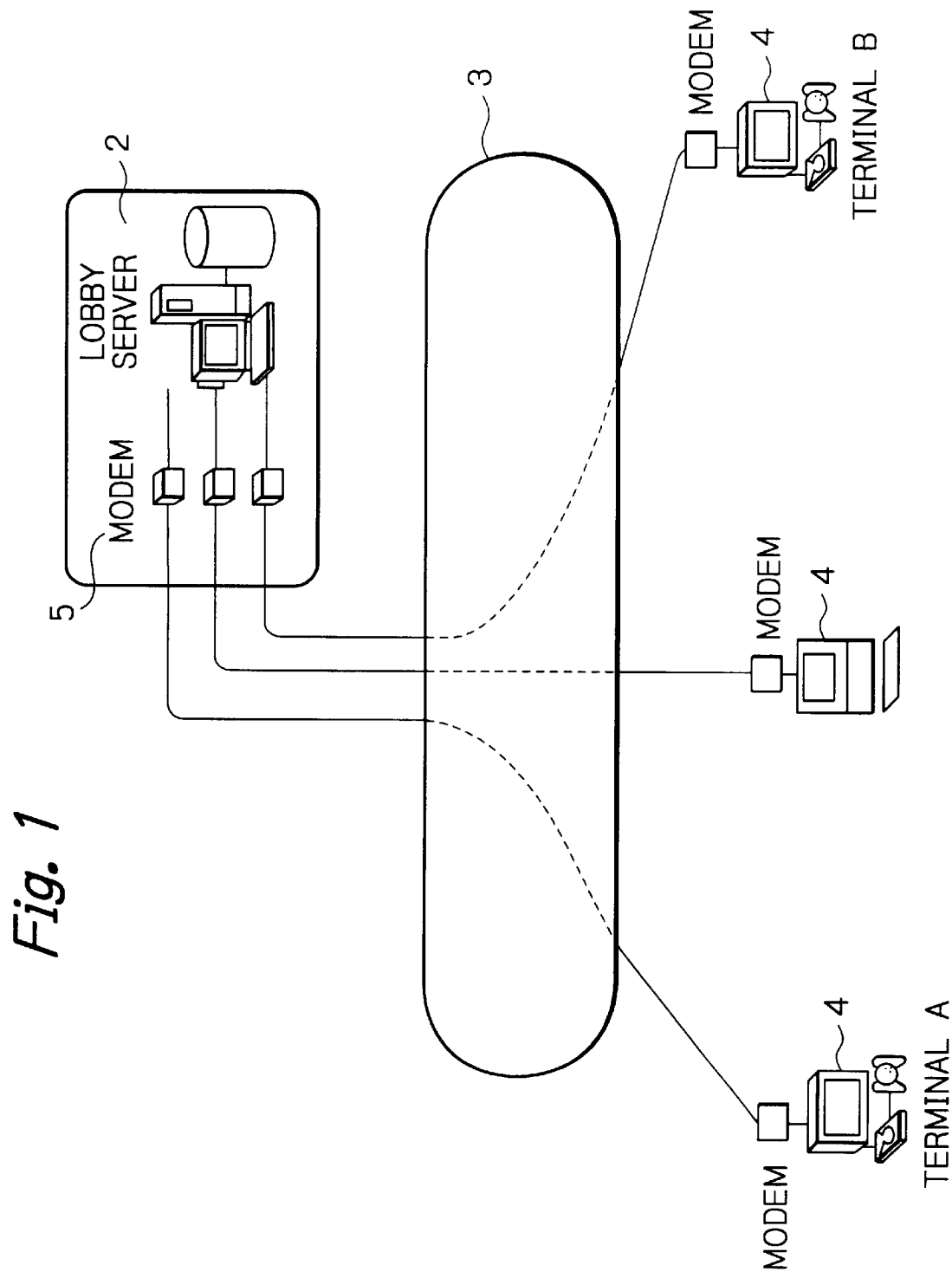
FIG. 1 schematically illustrates a system configuration of a conventional game service system.
Figure 2:
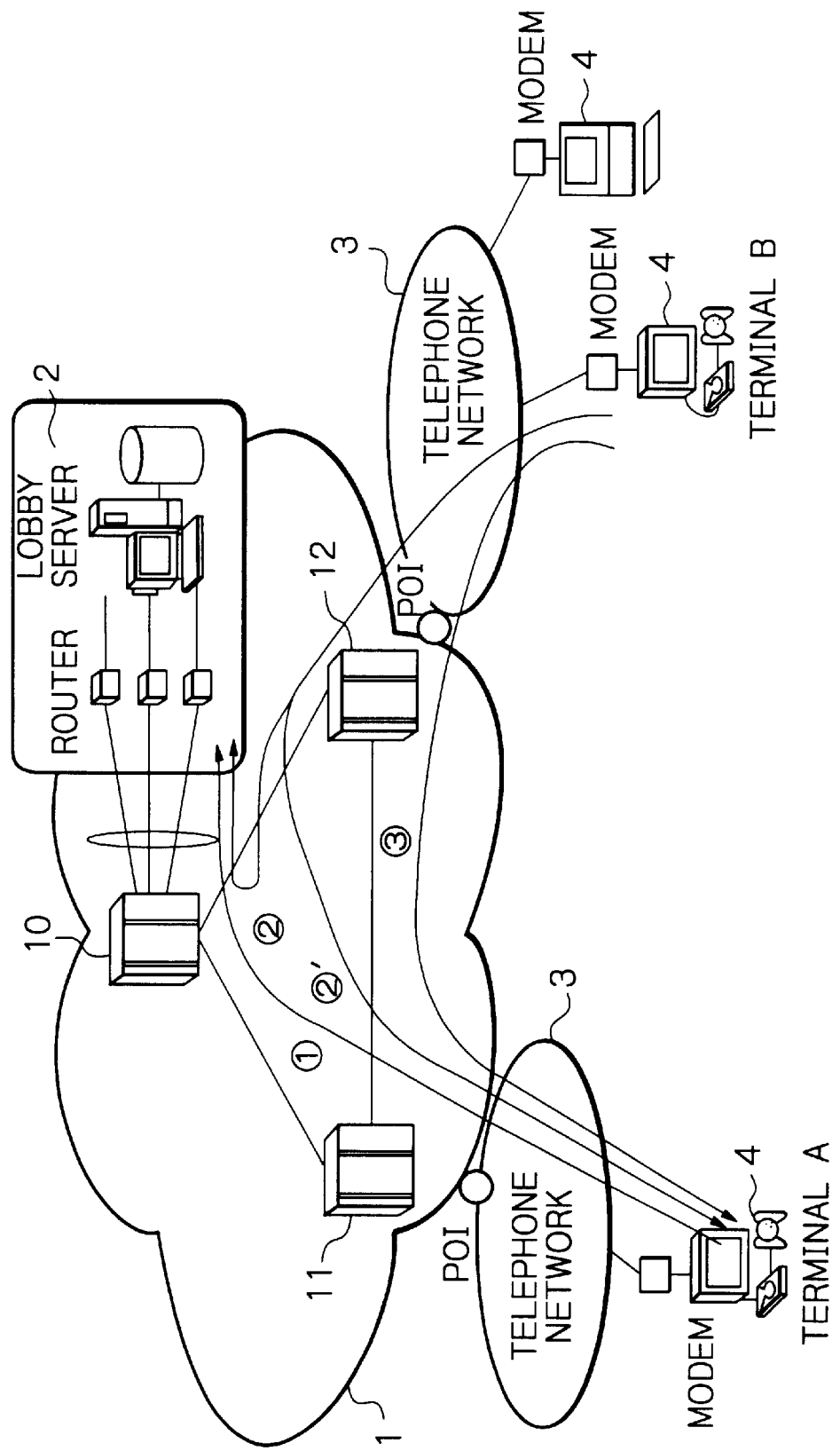
FIG. 2 schematically illustrates a system configuration of a preferred embodiment of a game service system according to the present invention.

FIG. 2 schematically illustrates a system configuration of a preferred embodiment of a game service system according to the present invention. In the system shown in FIG. 2, a wide bandwidth switched network 1 connected to a telephone networks 3 via a plurality of points of interface (POI) and a switched network control device 10 provided in the network 1 in addition to the system shown in FIG. 1.

A lobby server 2 in this embodiment selects one or more game players under a predetermined condition. This lobby server 2 may be a server provided by the software game company for performing the game of the company to exclusive use. The lobby server 2 is connected to the switched network control device 10.

The switched network 1 is realized by a data on-demand (DOD) service network in which a plurality of originators will access to one point. Thus, the DOD service provides a service that can be accounted by a charge system uniform from any national area and accessed by one number that is common to the whole country. According to this DOD service network, not only the caller accounting system as in the general telephone network, but also a split accounting system in which the account is divided into both users can be provided. Such split accounting system is very effective in that one-to-one games or games in each of which a plurality of players can simultaneously participate can be executed and in that account for using this network during the game can be equally divided.

The DOD service network also provides a quasi-DOD service. In general, registration is required for all subscriber terminal of the network before usage of this network. However, this quasi-DOD service enables the terminal to use DOD network without registration. Such service is effective in that a person who purchased software game can use the game service via the DOD network immediately.

The system shown in FIG. 2 establishes a connection between terminals without specifying a called terminal by a three-times connection sequence ((①→②→③) or a two-times connection sequence ((①→②→②)'). Hereinafter, these sequences and modifications will be described in detail.

First Sequence of Three-times Connection

Figure 3:
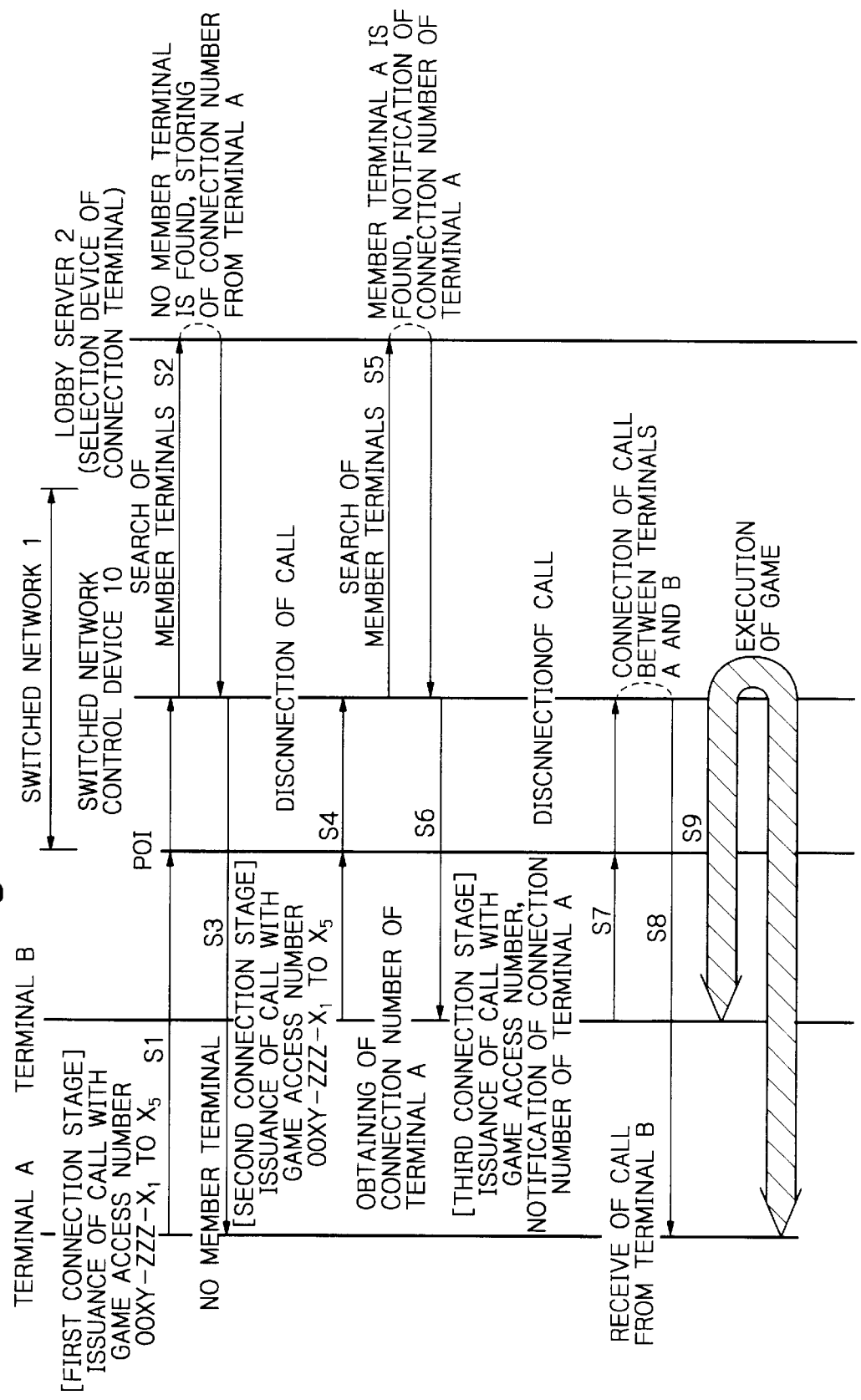
FIG. 3 schematically illustrates a first sequence of a three-times connection method in the system shown in FIG. 2.

FIG. 3 schematically illustrates a first sequence of the three-times connection method in the system shown in FIG. 2. This first sequence is a fundamental three-times connection sequence and has no security function of a connection number of a selected terminal.

[First Connection Stage]

First, a player issues a call from a terminal A to the switched network 1 with a predetermined game access number or connection number (S1). The call is noticed to the switched network control device 10 via the POI and an exchange 11. When the switched network control device 10 detects the call, this device 10 connects the call to the lobby server 2 and inquires whether there is a proper player to be connected (S2).

The lobby server 2 will find or select a proper player to be matched with the player of the terminal A (search of member terminals). If the server 2 cannot find nor select the proper player, this server 2 notices, "there is no terminal to be connected (no member terminal)" to the terminal A via the device 10 as the selection result, and then the call is disconnected (S3).

In this case, the lobby server 2 may register the predetermined game access number or the connection number of the terminal A as in waiting state. This number will be assigned in a higher priority to later inquiry for selection of a game player. Since the lobby server 2 has a database for storing personal information of players and historical information of game results, it is possible to find or select a proper player depending on the connection number from the terminal A, the personal information of the terminal A player and/or the historical information of the game result of the terminal A player.

[Second Connection Stage]

Another player issues a call from a terminal B to the switched network 1 with another predetermined game access number (S4). The call is noticed to the switched network control device 10 via the POI and an exchange 12. Thus, the switched network control device 10 connects the call to the lobby server 2 and inquires whether there is a proper player to be connected (S5).

Suppose that the lobby server 2 finds or selects, by the search of member terminals, the terminal A player as a proper player to be matched with the player of the terminal B. In this case, the server 2 notices, "there is a terminal to be connected (member terminal)" and "the connection number of the terminal A" to the terminal B via the device 10 as the selection result, and then the call is disconnected (S6).

The switched network control device 10 notices the connection number of the terminal A to the terminal B by inserting it in the data frame. In order to keep the connection number in secret, the terminal B will have no device for displaying the obtained connection number.

If the lobby server 2 finds or selects no member terminal to be connected, the server 2 notices, "there is no terminal to be connected (no member terminal)" to the terminal B via the device 10 as the selection result, and then the call is disconnected.

[Third Connection Stage]

The terminal B issues a call to the switched network 1 with the predetermined game access number and notices the connection number of the terminal A to be connected (S7). The number of the call out in this case is the predetermined game access number "OOXY-ZZZ-$X_1$ to $X_5$" and the connection number of the terminal A. When the call is detected, the switched network control device 10 calls the terminal A (S8). If the call is received at the terminal B, connection of the call between the terminals A and B is completed and a match type game is started (S9).

During the execution of the game between the terminal A and the terminal B, the switched network control device 10 controls so that the split account between the terminals is achieved, namely so that the communication charge of use of the switched network 1 is equally divided to the both terminals.

The aforementioned predetermined game access number includes the common number of OOXY-ZZZ which specifies this game service and number of $X_1$ to $X_5$ which may indicate a number of the lobby server, an ID number of the player, a number representing kind of the game, a game class number, a geographic area number of the selected player and/or an accounting method number. A game service provider can freely determine the game access number.

Although it is not shown in FIG. 3, it is desired to authenticate that the player of the terminal A is a legal player. Particularly, it is important to check whether a mala fide player intends to participate in the game by using an ID number of the legal player. Furthermore, it is useful to check whether the game software installed in the terminal A is an illegal copy or not, and also whether the player of the terminal A pays the charge within the due term.

Second Sequence of Three-times Connection

Figure 4:
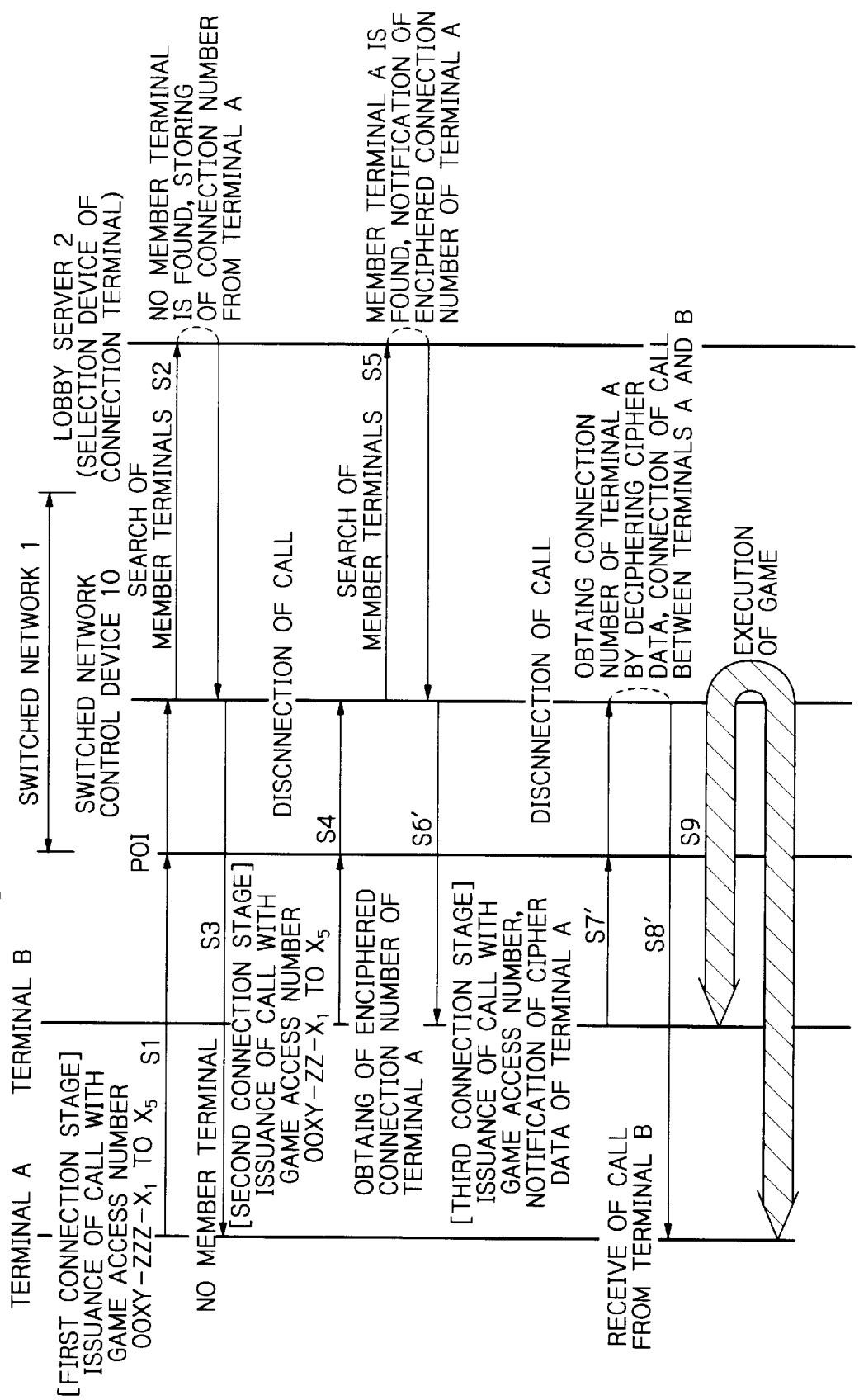
FIG. 4 schematically illustrates a second sequence of a three-times connection method in the system shown in FIG. 2.

FIG. 4 schematically illustrates a second sequence of the three-times connection method in the system shown in FIG. 2. This second sequence has a security function of the connection number of the terminal. Namely, the lobby server 2 enciphers the connection number of the terminal A, and the switched network control device 10 deciphers the cipher data.

[First Connection Stage]

The operation is the same as in the first sequence shown in FIG. 3.

[Second Connection Stage]

The lobby server 2 enciphers the connection number of the selected terminal A and notices the enciphered connection number of the terminal A to the terminal B via the device 10 as the selection result, and then the call is disconnected (S6'). Other operation is the same as that in the first sequence shown in FIG. 3.

[Third Connection Stage]

The terminal B issues a call to the switched network 1 with the predetermined game access number and notices the enciphered connection number of the terminal A to be connected (S7'). When the call is detected, the switched network control device 10 deciphers the cipher data to obtain the connection number of the terminal A and calls the terminal A (S8'). Other operation is the same as that in the first sequence shown in FIG. 3.

Third Sequence of Three-times Connection

FIG. 5 schematically illustrates a third sequence of the three-times connection method in the system shown in FIG. 2. In this third sequence, the connection number of the terminal is not noticed to a terminal of another player.

[First Connection Stage]

The operation is the same as in the first sequence shown in FIG. 3.

[Second Connection Stage]

The lobby server 2 notices, "there is a terminal to be connected (member terminal)" but never notices "the connection number of the terminal A" to the terminal B via the device 10 and the call is disconnected (S6"). Other operation is the same as that in the first sequence shown in FIG. 3.

[Third Connection Stage]

The terminal B only issues a call to the switched network 1 with the predetermined game access number (S7"). When the call is detected, the switched network control device 10 inquires the connection number of a terminal to be connected to the terminal B to the lobby server 2. The lobby server 2 notices the connection number of the terminal A to the device 10. Thus, the device 10 controls so that call connection between the terminal A and the terminal B is completed. Other operation is the same as that in the first sequence shown in FIG. 3.

It is necessary that the lobby server 2 store matching information between the terminals A and B when the terminal A is selected as a terminal to be connected with the terminal B. Since a closed network realizes the connection between the switched network control device 10 and the lobby server 2, the number of the terminal will not be leaked outside.

Sequence of Two-times Connection

FIG. 6 schematically illustrates a sequence of the two-times connection method in the system shown in FIG. 2.

[First Connection Stage]

The operation in this stage is the same as that in the first sequence shown in FIG. 3 except that the switched network control device 10 does not directly connect the call to the lobby server 2 but executes queuing of the call and inquires whether there is a proper player to be connected by an inquiry signal (S2''').

[Second Connection Stage]

Another player issues a call from the terminal B to the switched network 1 with another predetermined game access number (S4). The call is noticed to the switched network control device 10. Thus, the switched network control device 10 inquires to the lobby server 2 whether there is a proper player to be connected by an inquiry signal (S5''').

If the lobby server 2 finds or selects, by the search of member terminals, the terminal A player as a proper player to be matched with the player of the terminal B, the server 2 notices, "there is a terminal to be connected (member terminal)" and "the connection number of the terminal A" to the device 10 as the selection result. Then, the device 10 calls the terminal A (S10). Thereafter, the switched network control device 10 executes matching of the queuing call and the call issued to call the terminal A, so that connection of the call between the terminals A and B is completed. Thus, a match type game is started between the terminals A and B (S9).

FIG. 7 schematically illustrates a configuration of the switched network control device 10 according to the present invention.

As shown in the figure, the device 10 has a detection unit for detecting a predetermined number 101, an inquiry unit for inquiring a terminal to be connected 102, a call control unit 102, a switching unit for switching a call-connection terminal 104, a split accounting unit 105, an authentication unit 106, a call count and charge limitation unit 107 and a deciphering unit 108.

This switched network control device 10 is connected to the selection device of terminal to be connected, namely to the lobby server 2, which finds and selects at least one first terminal to be connected to a second terminal and notices, "there is no terminal to be connected" or "there is a terminal to be connected" and "a connection number of the first terminal". The device 10 connects the call with a predetermined number without specifying a called terminal from the second terminal with the first terminal.

In the first three-times connection sequence shown in FIG. 3, the call control unit 102 in the device 10 connects the second terminal with the selection device 2 when the detection unit 101 detects only "a predetermined number", and the call control unit 102 connects the second terminal with the first terminal when the detection unit 101 detects both "a predetermined number" and "a connection number of the first terminal".

In the second three-times connection sequence shown in FIG. 4, when "a connection number of the first terminal" from the second terminal is a cipher data, the deciphering unit 108 in the device 10 decodes this ciphered connection number of the first terminal.

In the third three-times connection sequence shown in FIG. 5, when the detection unit 101 in the device 10 detects both "a predetermined number" and "there is a terminal to be connected", the call control unit 102 in the device 10 obtains "a connection number of the first terminal" via the terminal inquiry unit 103 from the selection device 2 based on "a predetermined number".

In the two-times connection sequence shown in FIG. 6, when the detection unit 101 in the device 10 detects "a predetermined number", the call control unit 102 in the device 10 obtains "there is no terminal to be connected", or "there is a terminal to be connected" and "a connection number of the first terminal" via the terminal inquiry unit 103 from the selection device 2 based on "a predetermined number". If it is "there is no terminal to be connected", the call control unit 102 notices it to the call originator terminal and disconnects the call. If it is "there is a terminal to be connected", the call control unit 102 notices it to the call-connection terminal switching unit 104. This unit 104 calls a terminal with "a connection number of the first terminal". Then, the unit 104 executes matching of the queuing call and the call issued to call the terminal so that connection of the call between the first and second terminals B is completed. The queuing is a function for temporally holding the call and is one of functions provided in the conventional switch.

The split accounting unit 105 of the switched network control device 10 equally divides the charge into a plurality of terminals, and the authentication unit 106 of the device 10 authenticates the terminal. The call count and charge limitation unit 107 of the device 10 will operate to limit the number of calls from a terminal or the charge of a terminal to its upper limit, and to reject connection of a terminal when the payment of the charge is delayed from the due term.

The above-mentioned game terminals may be not only special-purpose game terminals but also personal computers or mobile phone terminals in which game software is installed.

In the aforementioned embodiments, the present invention is described by using examples of the game service. However, it is apparent that the present invention can be adopted in any services such as a television conference service, in which two or more persons are simultaneously participate and high-speed information transmission is required.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method for establishing a connection in a system without specifying a called terminal, said system including a plurality of terminals which contain first and second terminals, a terminal selection device for selecting at least one terminal to be connected from said terminals and a switched network control device for controlling connection of call between said terminals and said terminal selection device, said method comprising first to third connection stages, said first connection stage comprising issuing a call from said first terminal using a predetermined number without specifying a called terminal, connecting by said switched network control device said call from said first terminal with said terminal selection device, registering said first terminal in said terminal selection device when no terminal is selected, noticing "there is no terminal to be connected" to said first terminal as a selected result from said terminal selection device when no terminal is selected, and disconnecting the call, said second connection stage comprising issuing a call from said second terminal using a predetermined number without specifying a called terminal, connecting by said switched network control device said call from said second terminal with said terminal selection device, noticing "there is a terminal to be connected" and "a connection number of said first terminal" to said second terminal as a selected result from said terminal selection device when said first terminal is selected, and disconnecting the call, said third connection stage comprising issuing a call from said second terminal using said predetermined number when said selection result is "there is a terminal to be connected", noticing "a connection number of said first terminal" from said second terminal to said switched network control device, and connecting by said switched network control device said call from said second terminal with said first terminal, said switched network control device executing a split accounting for dividing a connection charge among terminals connected with each other.

2. The method as claimed in claim 1, wherein said method is used in a service for providing a place in which a plurality of members for operating said terminals can simultaneously participate.

3. The method as claimed in claim 2, wherein said terminals has at least one game software, and wherein said terminal selection device selects at least one game player under a predetermined condition.

4. The method as claimed in claim 3, wherein said predetermined number includes a common number which specifies said service, and includes an ID number of the game player, a number representing kind of the game service, a game class number, a geographic area number of a selected game player and/or an accounting method number.

5. The method as claimed in claim 3, wherein said terminal selection device has a database for storing personal information of the game player and historical information of game results, and wherein said terminal selection device selects the second terminal to be connected depending on said predetermined number from said first terminal, the personal information of the game player and/or the historical information of game results.

6. The method as claimed in claim 3, wherein said terminal selection device registers the predetermined number from said first terminal in waiting state when noticing "there is no terminal to be connected" to said first terminal as the selected result, and selects in a higher priority said first terminal based on the registered predetermined number in response to later inquiry for selection of a game player.

7. The method as claimed in claim 1, wherein said switched network control device authenticates said terminals when one of said terminals issues a call using a predetermined number.

8. The method as claimed in claim 1, wherein said switched network control device rejects connection of a call from a terminal when the number of calls from said terminal exceeds a predetermined number or a connection charge of said terminal exceeds a predetermined limit.

9. A method for establishing a connection in a system without specifying a called terminal, said system including a plurality of terminals which contain first and second terminals, a terminal selection device for selecting at least one terminal to be connected from said terminals and a switched network control device for controlling connection of call between said terminals and said terminal selection device, said method comprising first to third connection stages, said first connection stage comprising issuing a call from said first terminal using a predetermined number without specifying a called terminal, connecting by said switched network control device the call from said first terminal with said terminal selection device, registering said first terminal in said terminal selection device when no terminal is selected, noticing "there is no terminal to be connected" to said first terminal as a selected result from said terminal selection device when no terminal is selected, and disconnecting the call, said second connection stage comprising issuing a call from said second terminal using a predetermined number without specifying a called terminal, connecting by said switched network control device the call from said second terminal with said terminal selection device, noticing "there is a terminal to be connected" and cipher data of "a connection number of said first terminal" to said second terminal as a selected result from said terminal selection device when said first terminal is selected, and disconnecting the call, said third connection stage comprising issuing a call from said second terminal using the predetermined number when the selection result is "there is a terminal to be connected", noticing "cipher data of a connection number of said first terminal" from said second terminal to said switched network control device, deciphering said cipher data to obtain a connection number of said first terminal", and connecting by said switched network control device the call from said second terminal with said first terminal.

10. The method as claimed in claim 9, wherein said method is used in a service for providing a place in which a plurality of members for operating said terminals can simultaneously participate.

11. The method as claimed in claim 10, wherein said terminals has at least one game software, and wherein said terminal selection device selects at least one game player j under a predetermined condition.

12. The method as claimed in claim 11, wherein said predetermined number includes a common number which specifies said service, and includes an ID number of the game player, a number representing kind of the game service, a game class number, a geographic area number of a selected game player and/or an accounting method number.

13. The method as claimed in claim 11, wherein said terminal selection device has a database for storing personal information of the game player and historical information of game results, and wherein said terminal selection device selects the second terminal to be connected depending on said predetermined number from said first terminal, the personal information of the game player and/or the historical information of game results.

14. The method as claimed in claim 11, wherein said terminal selection device registers the predetermined number from said first terminal in waiting state when noticing "there is no terminal to be connected" to said first terminal as the selected result, and selects in a higher priority said first terminal based on the registered predetermined number in response to later inquiry for selection of a game player.

15. The method as claimed in claim 9, wherein said switched network control device authenticates said terminals when one of said terminals issues a call using a predetermined number.

16. The method as claimed in claim 9, wherein said switched network control device executes a split accounting I for dividing a connection charge among terminals connected with each other.

17. The method as claimed in claim 9, wherein said switched network control device rejects connection of a call from a terminal when the number of calls from said terminal exceeds a predetermined number or a connection charge of said terminal exceeds a predetermined limit.

18. A method for establishing a connection in a system without specifying a called terminal, said system including a plurality of terminals which contain first and second terminals, a terminal selection device for selecting at least one terminal to be connected from said terminals and a switched network control device for controlling connection of call between said terminals and said terminal selection device, said method comprising first to third connection stages, said first connection stage comprising issuing a call from said first terminal using a predetermined number without specifying a called terminal, connecting by said switched network control device the call from said first terminal with said terminal selection device, registering said first terminal in said terminal selection device when no terminal is selected, noticing "there is no terminal to be connected" to said first terminal as a selected result from said terminal selection device when no terminal is selected, and disconnecting the call, said second connection stage comprising issuing a call from said second terminal using a predetermined number without specifying a called terminal, connecting by said switched network control device the call from said second terminal with said terminal selection device, noticing "there is a terminal to be connected" to said second terminal as a selected result from said terminal selection device when said first terminal is selected, and disconnecting the call, said third connection stage comprising issuing a call from said second terminal using the predetermined number when the selection result is "there is a terminal to be connected", noticing said predetermined number from said switched network control device to said terminal selection device to obtain the connection number of said first terminal, and connecting by said switched network control device the call from said second terminal with said first terminal.

19. The method as claimed in claim 18, wherein said method is used in a service for providing a place in which a plurality of members for operating said terminals can simultaneously participate.

20. The method as claimed in claim 19, wherein said terminals has at least one game software, and wherein said terminal selection device selects at least one game player under a predetermined condition.

21. The method as claimed in claim 20, wherein said predetermined number includes a common number which specifies said service, and includes an ID number of the game player, a number representing kind of the game service, a game class number, a geographic area number of a selected game player and/or an accounting method number.

22. The method as claimed in claim 20, wherein said terminal selection device has a database for storing personal information of the game player and historical information of game results, and wherein said terminal selection device selects the second terminal to be connected depending on said predetermined number from said first terminal, the personal information of the game player and/or the historical information of game results.

23. The method as claimed in claim 20, wherein said terminal selection device registers the predetermined number from said first terminal in waiting state when noticing "there is no terminal to be connected" to said first terminal as the selected result, and selects in a higher priority said first terminal based on the registered predetermined number in response to later inquiry for selection of a game player.

24. The method as claimed in claim 18, wherein said switched network control device authenticates said terminals when one of said terminals issues a call using a predetermined number.

25. The method as claimed in claim 18, wherein said switched network control device executes a split accounting for dividing a connection charge among terminals connected with each other.

26. The method as claimed in claim 18, wherein said switched network control device rejects connection of a call from a terminal when the number of calls from said terminal exceeds a predetermined number or a connection charge of said terminal exceeds a predetermined limit.

27. A method for establishing a connection in a system without specifying a called terminal, said system including a plurality of terminals which contain first and second terminals, a terminal selection device for selecting at least one terminal to be connected from said terminals and a switched network control device for controlling connection of call between said terminals and said terminal selection device, said method comprising first and second connection stages, said first connection stage comprising issuing a call from said first terminal using a predetermined number without specifying a called terminal, queuing and inquiring the call from said first terminal by said switched network control device to said terminal selection device, noticing "there is no terminal to be connected" to said first terminal as a selected result from said terminal selection device when no terminal is selected, and disconnecting the call, said second connection stage comprising issuing a call from said second terminal using a predetermined number without specifying a called terminal, queuing and inquiring the call from said second terminal by said switched network control device to said terminal selection device, noticing "there is a terminal to be connected" and "a connection number of said first terminal" to said switched network control device as a selected result from said terminal selection device when said first terminal is selected, calling said first terminal from said switched network control device when the selection result is "there is a terminal to be connected", and connecting by said switched network control device the call from said second terminal with said first terminal.

28. The method as claimed in claim 27, wherein said method is used in a service for providing a place in which a plurality of members for operating said terminals can simultaneously participate.

29. The method as claimed in claim 28, wherein said terminals has at least one game software, and wherein said terminal selection device selects at least one game player under a predetermined condition.

30. The method as claimed in claim 29, wherein said predetermined number includes a common number which specifies said service, and includes an ID number of the game player, a number representing kind of the game service, a game class number, a geographic area number of a selected game player and/or an accounting method number.

31. The method as claimed in claim 29, wherein said terminal selection device has a database for storing personal information of the game player and historical information of game results, and wherein said terminal selection device selects the second terminal to be connected depending on said predetermined number from said first terminal, the personal information of the game player and/or the historical information of game results.

32. The method as claimed in claim 29, wherein said terminal selection device registers the predetermined number from said first terminal as in waiting state when noticing "there is no terminal to be connected" to said first terminal as the selected result, and selects in a higher priority said first terminal based on the registered predetermined number in response to later inquiry for selection of a game player.

33. The method as claimed in claim 27, wherein said switched network control device authenticates said terminals when one of said terminals issues a call using a predetermined number.

34. The method as claimed in claim 27, wherein said switched network control device executes a split accounting for dividing a connection charge among terminals connected with each other.

35. The method as claimed in claim 27, wherein said switched network control device rejects connection of a call from a terminal when the number of calls from said terminal exceeds a predetermined number or a connection charge of said terminal exceeds a predetermined limit.

36. A system for establishing a connection without specifying a called terminal, the system including a plurality of terminals which contain first and second terminals, a terminal selection device for selecting at least one terminal to be connected from the terminals and a switched network control device for controlling connection of call between the terminals and the terminal selection device, the second terminal comprising means for issuing a call using a predetermined number without specifying a called terminal, and means for noticing a connection number of the first terminal to be connected to the switched network control device, the switched network control device comprising means for receiving the call from the second terminal, means for connecting the call from the second terminal with the first terminal when the connection number of the first terminal is noticed from the second terminal, and means for connecting the call from the second terminal with the terminal selection device when the connection number of the first terminal is not noticed from the second terminal, the terminal selection device comprising means for noticing "there is no terminal to be connected" to the second terminal as a selected result to disconnect the call when no terminal is selected, and for noticing "there is a terminal to be connected" and "a connection number of the first terminal" to the second terminal as a selected result when the first terminal is selected to disconnect the call, the switched network control device executing a split accounting for dividing a connection charge among terminals connected with each other.

37. A system for establishing a connection without specifying a called terminal, said system including a plurality of terminals which contain first and second terminals, a terminal selection device for selecting at least one terminal to be connected from said terminals and a switched network control device for controlling connection of call between said terminals and said terminal selection device, said second terminal comprising means for issuing a call using a predetermined number without specifying a called terminal, and means for noticing cipher data of a connection number of said first terminal to be connected to said switched network control device, said switched network control device comprising means for receiving the call from said second terminal, means for deciphering the cipher data when the cipher data of the connection number of said first terminal is noticed from said second terminal, and means for connecting the call from said second terminal with said first terminal by using the deciphered connection number of said first terminal, said terminal selection device comprising means for noticing "there is no terminal to be connected" to said second terminal as a selected result to disconnect the call when no terminal is selected, and for noticing "there is a terminal to be connected" and "cipher data of a connection number of said first terminal" to said second terminal as a selected result when said first terminal is selected to disconnect the call.

38. A system for establishing a connection without specifying a called terminal, said system including a plurality of terminals which contain first and second terminals, a terminal selection device for selecting at least one terminal to be connected from said terminals and a switched network control device for controlling connection of call between said terminals and said terminal selection device, said second terminal comprising means for issuing a call using a predetermined number without specifying a called terminal, said switched network control device comprising means for receiving the call from said second terminal, means for obtaining a connection number of said first terminal from said terminal selection device by noticing the predetermined number of said second terminal to said terminal selection device, means for noticing, "there is no terminal to be connected" to said second terminal and for disconnecting the call from said second terminal when "there is no terminal to be connected" is noticed from said terminal selection device, and means for connecting the call from said second terminal with said first terminal when "there is a terminal to be connected" and "a connection number of said first terminal" are noticed from said terminal selection device, said terminal selection device comprising means for noticing "there is no terminal to be connected" to said switched network control device as a selected result in response to the noticed predetermined number of said second terminal when no terminal is selected, and for noticing "there is a terminal to be connected" and "a connection number of said first terminal" to said switched network control device as a selected result in response to the noticed predetermined number of said second terminal when said first terminal is selected.

39. A system for establishing a connection without specifying a called terminal, said system including a plurality of terminals which contain first and second terminals, a terminal selection device for selecting at least one terminal to be connected from said terminals and a switched network control device for controlling connection of call between said terminals and said terminal selection device, said second terminal comprising means for issuing a call using a predetermined number without specifying a called terminal, said switched network control device comprising means for receiving the call from said second terminal, means for queuing the call, means for obtaining a connection number of said first terminal from said terminal selection device by noticing the predetermined number of said second terminal to said terminal selection device, means for noticing, "there is no terminal to be connected" to said second terminal and for disconnecting the call from said second terminal when "there is no terminal to be connected" is noticed from said terminal selection device, and means for connecting the call from said second terminal with said first terminal when "there is a terminal to be connected" and "a connection number of said first terminal" are noticed from said terminal selection device, said terminal selection device comprising means for noticing "there is no terminal to be connected" to said switched network control device as a selected result in response to the noticed predetermined number of said second terminal when no terminal is selected, and for noticing "there is a terminal to be connected" and "a connection number of said first terminal" to said switched network control device as a selected result in response to the noticed predetermined number of said second terminal when said first terminal is selected.

40. A switched network control device connected to a terminal selection device which selects at least one first terminal to be connected to a second terminal and notices, "there is no terminal to be connected" or "there is a terminal to be connected" and "a connection number of the first terminal", for connecting the call with a predetermined number without specifying a called terminal from said second terminal with said first terminal, said switched network control device comprising a predetermined number detection means for detecting a predetermined number and a call control means for connecting a call, said call control means connecting said second terminal with said terminal selection device when said predetermined number detection means detects only "a predetermined number", and connecting the second terminal with said first terminal when said predetermined number detection means detects both "a predetermined number" and "a connection number of the first terminal", said switched network control device further comprises a terminal inquiry means for inquiring "a connection number of the first terminal" to said terminal selection device based upon "a predetermined number" from said second terminal, and wherein said call control means obtains "a connection number of the first terminal" from said terminal inquiry means when said predetermined number detection means detects "there is a terminal to be connected" and "a predetermined number".

41. The device as claimed in claim 40, wherein said switched network control device further comprises means for deciphering cipher data when the cipher data of a connection number of the first terminal is noticed to the switched network control device.

42. The device as claimed in claim 40, wherein said switched network control device further comprises an authentication means for authenticating said terminals, and a split accounting means for rejecting connection of a call from a terminal when the number of calls from said terminal exceeds a predetermined number or a connection charge of said terminal exceeds a predetermined limit.

* * * * *